Patented Aug. 3, 1926.

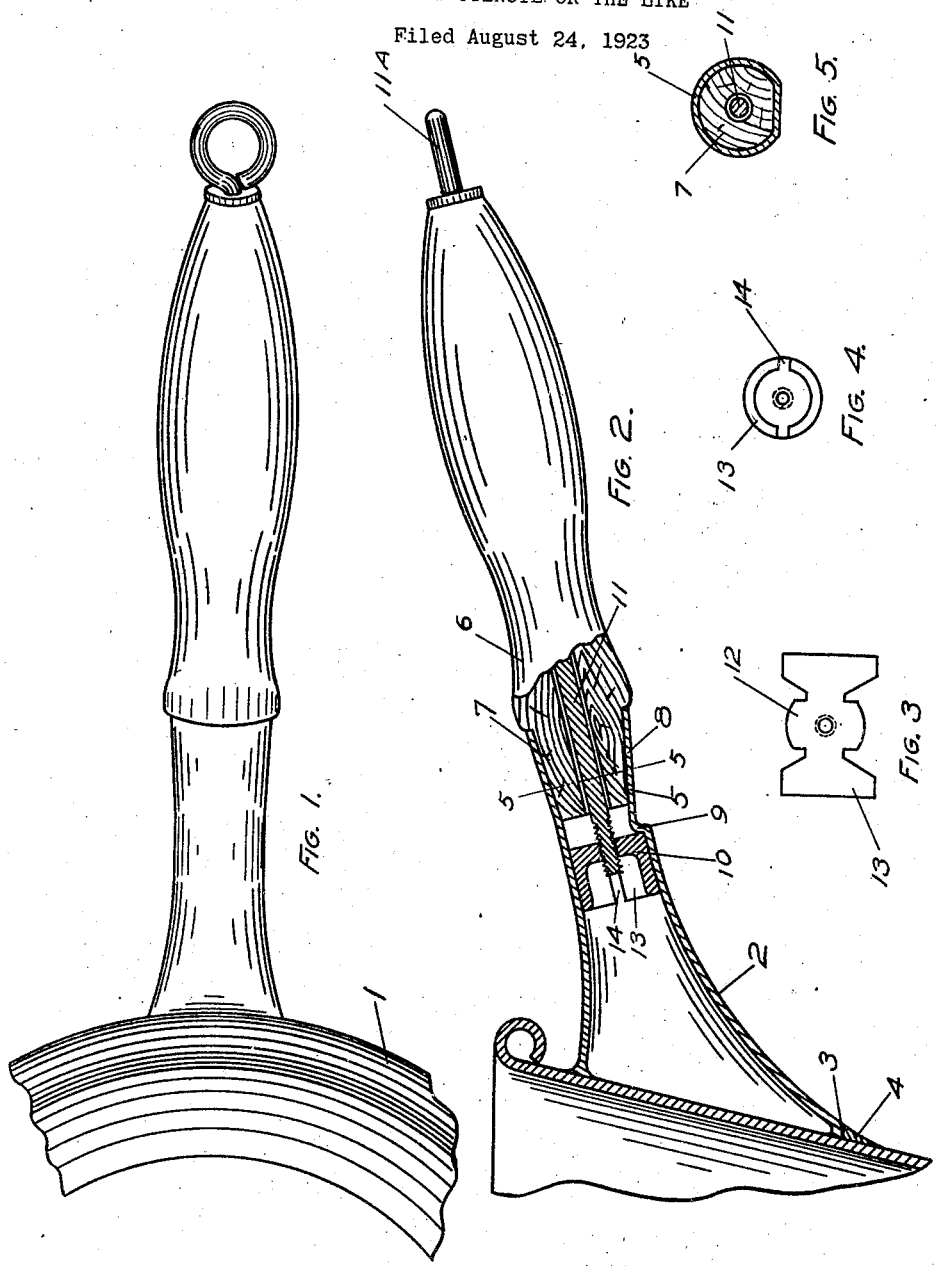

1,594,764

UNITED STATES PATENT OFFICE.

SPENCER A. WILTSIE, OF ERIE, PENNSYLVANIA, ASSIGNOR TO WELDA-WARE PRODUCTS COMPANY, OF ERIE, PENNSYLVANIA, A CORPORATION OF PENNSYLVANIA.

COOKING UTENSIL OR THE LIKE.

Application filed August 24, 1923. Serial No. 659,099.

This invention is designed to improve the construction of handles on cooking utensils making a wooden handle for such a utensil practical. To utilize a wooden handle it is necessary to provide a socket into which the wooden handle may extend and to connect this socket with the wall of the receptacle so that there will be a rigid connection between the receptacle and the wooden handle and at the same time so little transfer of receptacle heat to the wooden handle as to obviate damaging the handle. In carrying out my invention I form a handle connection on the side of the receptacle of hollow thin sheet metal preferably welded to the side wall of the receptacle and form in this thin metal a handle socket at its outer end forming a restriction in the handle for engaging a nut into which a rod extending through the handle is screwed for drawing the handle into the socket. I also provide means for venting the handle so as to prevent damage due to pressure with the heating of the air in the handle. Other features and details of construction will appear from the specification and claims.

The invention is illustrated in the accompanying drawings as follows:—

Fig. 1 shows a partial plan view of the receptacle.

Fig. 2 a side elevation, partly in section, through the handle.

Fig. 3 a plan view of the blank forming the nut.

Fig. 4 a plan view of the finished nut.

Fig. 5 a section on the line 5—5 in Fig. 2.

1 marks the receptacle, and 2 a handle connection. This handle connection is preferably drawn from sheet metal and flares toward the wall of the receptacle and is secured to the receptacle by welding. At the lower edge of such a flared connection if the walls were continued in the direction of the flare the weld material would flow to within the handle rather than filling the space between the side wall of the receptacle and the outer face of the connection. To obviate this I curl the parts of the connection which the flare brings to an acute angle inwardly at 3 so that there will be a space at 4 which the welding metal may readily fill and continue the surface of the handle.

A handle socket 5 is formed in the outer part of the connection and a handle 6 has a tapered lower end 7 which fits into the socket. The socket has a flat portion 8 in one wall which is engaged by a corresponding flat portion on the tapered end 7 and this prevents the handle from turning in the socket when the handle is drawn to place.

The forming of the flat portion also terminates in a shoulder 9 at its inner end which is the point of greatest restriction in the connection and a nut 10 is drawn in from the flared end of the connection and seated against the shoulder. A rod 11 extends through the handle and is screwed into the nut 10, the rod having the usual eye 11ª at its outer end.

In order to assure the nut remaining in its position in the connection to facilitate the assembling of the handle it is desirable to have the nut secured in the connection so as to prevent its displacement as the rod is screwed into it. I prefer, therefore, to form the nut as shown in Figs. 3 and 4 of a stamping 12 having wings 13 which are bent down from the nut proper. These wings when forced into the connection yieldingly engage the walls of the connection and prevent the disengagement of the nut.

In order to prevent damage to the wall of the receptacle due to pressure in the handle it is necessary to vent the space in the connection and this is conveniently done in the present structure by the slit 14 formed between the wings 13 on the nut as this permits the escape of air past the nut which readily finds its way through the opening in the handle through which the rod extends or between the handle and the socket.

What I claim as new is:—

1. In a cooking utensil or the like, the combination of a receptacle; a wooden handle; and a handle connection, said connection being hollow with thin annular metal walls flaring toward and secured to the side of the receptacle, the edge of the connection abutting the receptacle being deflected from the line of the flared wall toward the receptacle forming a filling space for welding material, said connection being secured to the side of the receptacle by welding and having a socket at its outer end receiving the wooden handle.

2. In a cooking utensil or the like, the combination of a receptacle; a wooden handle; a handle connection, said connection being hollow with thin annular metal walls secured to the side of the receptacle and having a socket at its outer end receiving the wooden handle, said connection having a constriction at the base of the socket; a nut seated against the side of the constriction facing the receptacle, said nut formed with wings of resilient material forming a spring pressed engagement with the inner walls of the connection for holding the nut in place, and a rod extending through the handle into the nut.

3. In a cooking utensil or the like, the combination of a receptacle; a wooden handle; a handle connection, said connection being hollow with thin annular metal walls secured to the side of the receptacle and having a socket at its outer end receiving the wooden handle, said socket having a flat portion therein for locking the handle against turning the base of the flat portion forming a shoulder in the connection; a nut within the connection seated against the shoulder; and a rod extending through the handle into the nut.

4. In a cooking utensil or the like, the combination of a receptacle; a wooden handle; a handle connection, said connection being hollow with thin annular metal walls secured to the side of the receptacle and having a socket at its outer end receiving the wooden handle; and means for venting the connection through the handle socket.

5. In a cooking utensil or the like, the combination of a receptacle; a wooden handle; a handle connection, said connection being hollow with thin annular metal walls secured to the side of the receptacle and having a socket at its outer end receiving the wooden handle, said connection having a constriction at the base of the socket; a nut arranged in the constriction, said nut having wings engaging the walls of the constriction, said wings forming venting slots for the connection; and a rod extending through the handle into the nut.

In testimony whereof I have hereunto set my hand.

SPENCER A. WILTSIE.